(12) United States Patent
Mathew et al.

(10) Patent No.: US 8,149,529 B2
(45) Date of Patent: Apr. 3, 2012

(54) DIBIT EXTRACTION FOR ESTIMATION OF CHANNEL PARAMETERS

(75) Inventors: George Mathew, San Jose, CA (US); Hongwei Song, Longmont, CO (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/845,110

(22) Filed: Jul. 28, 2010

(65) Prior Publication Data

US 2012/0026623 A1 Feb. 2, 2012

(51) Int. Cl.
*G11B 5/09* (2006.01)

(52) U.S. Cl. ......................................... 360/46

(58) Field of Classification Search .................. 360/46, 360/31, 39, 25, 48, 65, 67; 375/232, 233, 375/142, 322, 341, 346; 714/746, 796; 369/53.16, 369/53.19; 381/17; 704/228
See application file for complete search history.

(56) References Cited

U.S. PATENT DOCUMENTS

| | | | | |
|---|---|---|---|---|
| 4,811,271 A * | 3/1989 | Svoboda et al. | ............. | 708/420 |
| 5,615,298 A * | 3/1997 | Chen | ............. | 704/228 |
| 5,621,580 A * | 4/1997 | Cruz et al. | ............. | 360/48 |
| 5,777,912 A * | 7/1998 | Leung et al. | ............. | 708/319 |
| 5,884,010 A * | 3/1999 | Chen et al. | ............. | 704/228 |
| 6,010,456 A * | 1/2000 | Rhyne | ............. | 600/447 |
| 6,055,269 A * | 4/2000 | Drost et al. | ............. | 375/232 |
| 6,178,245 B1 * | 1/2001 | Starkey et al. | ............. | 381/17 |
| 6,226,323 B1 * | 5/2001 | Tan et al. | ............. | 375/233 |
| 6,456,646 B1 * | 9/2002 | Asokan et al. | ............. | 375/142 |
| 6,707,624 B2 * | 3/2004 | Erden et al. | ............. | 360/31 |
| 6,754,015 B2 * | 6/2004 | Erden et al. | ............. | 360/25 |
| 6,788,481 B2 | 9/2004 | Fang et al. | ............. | 360/31 |
| 6,967,598 B2 * | 11/2005 | Mills | ............. | 341/50 |
| 7,145,966 B2 * | 12/2006 | Lai et al. | ............. | 375/330 |
| 7,170,704 B2 | 1/2007 | DeGroat et al. | ............. | 360/53 |
| 7,228,480 B1 * | 6/2007 | McEwen et al. | ............. | 714/746 |
| 7,277,481 B2 * | 10/2007 | Tan et al. | ............. | 375/233 |
| 7,349,493 B2 * | 3/2008 | Rudkin | ............. | 375/322 |

(Continued)

FOREIGN PATENT DOCUMENTS

WO  WO 2008059406 A1  5/2008

OTHER PUBLICATIONS

Lin, Y. "'Shift and add' property of m-sequences and its application to channel characterisation of digital magnetice recording," *IEEE Proc.-Commun.*, vol. 142, No. 3, Jun. 1995, pp. 135-140.

Palmer, Dean, et al. "Identification of Nonlinear Write Effects Using Pseudorandom Sequences," *IEEE Transactions on Magnetics*, vol. MAG-23, No. 5, Sep. 1987, pp. 2377-2379.

(Continued)

*Primary Examiner* — Fred Tzeng

(74) *Attorney, Agent, or Firm* — Mendelsohn, Drucker & Associates, P.C.; Kevin M. Drucker; Steve Mendelsohn

(57) ABSTRACT

In one embodiment, a storage-device-implemented method for estimating one or more channel parameters of a storage device including a read channel and a storage medium with a bit sequence stored on the storage medium. The method includes: (a) the storage device reading at least a portion of the bit sequence from the storage medium to generate a bit response; (b) the storage device convolving the bit response to compute an impulse response of the read channel; and (c) the storage device estimating one or more channel parameters based on the computed impulse response.

20 Claims, 3 Drawing Sheets

U.S. PATENT DOCUMENTS

| | | | | |
|---|---|---|---|---|
| 7,474,695 B2* | 1/2009 | Liu et al. | | 375/233 |
| 7,640,282 B2* | 12/2009 | Kirkby | | 708/314 |
| 7,702,991 B2* | 4/2010 | Haratsch | | 714/796 |
| 2003/0107831 A1* | 6/2003 | Erden et al. | | 360/31 |
| 2005/0213241 A1* | 9/2005 | Cideciyan et al. | | 360/65 |
| 2005/0264906 A1* | 12/2005 | Haratsch | | 360/39 |
| 2007/0136595 A1* | 6/2007 | Baum et al. | | 713/176 |
| 2008/0310274 A1* | 12/2008 | Yin | | 369/53.19 |
| 2009/0285341 A1* | 11/2009 | Pukkila et al. | | 375/346 |
| 2010/0053787 A1 | 3/2010 | Mathew et al. | | |
| 2010/0053793 A1 | 3/2010 | Mathew et al. | | |
| 2010/0157458 A1 | 6/2010 | Mathew et al. | | 360/39 |
| 2010/0284257 A1* | 11/2010 | Nakamura et al. | | 369/53.16 |
| 2011/0103527 A1* | 5/2011 | Liu et al. | | 375/341 |

OTHER PUBLICATIONS

Lin, Yinyi and Wood, Roger, "An Estimation Technique for Accurately Modelling the Magnetic Recording Channel Including Nonlinearities," *IEEE Transactions on Magnetics*, vol. 25, No. 5, Sep. 1989, pp. 4084-4086.

Wood, Roger W. and Donaldson, Robert W., "The Helical-Scan Magnetic Tape Recorder As a Digital Communication Channel," *IEEE Transactions on Magnetics*, vol. MAG-15, No. 2, Mar. 1979, pp. 935-943.

Kavcic, A. et al. "The Read Channel"; Proceedings of The IEEE; IEEE. New York, US; vol. 96, No. 11, Nov. 1, 2008; pp. 1767-1774.

European Search Report; Mailed Sep. 7, 2011 for corresponding European Application No. 11005817.9.

* cited by examiner

| 0.1T | 0.2T | 0.3T | 0.4T | 0.5T | 0.6T | 0.7T | 0.8T | 0.9T |
|---|---|---|---|---|---|---|---|---|
| -0.0023 | -0.0037 | -0.0042 | -0.0040 | -0.0034 | 0.0137 | 0.0103 | 0.0066 | 0.0031 |
| 0.0075 | 0.0129 | 0.0161 | 0.0170 | 0.0161 | -0.0357 | -0.0279 | -0.0186 | -0.0090 |
| -0.0172 | -0.0303 | -0.0386 | -0.0420 | -0.0407 | 0.0766 | 0.0606 | 0.0409 | 0.0200 |
| 0.0359 | 0.0634 | 0.0810 | 0.0886 | 0.0866 | -0.1624 | -0.1274 | -0.0856 | -0.0417 |
| -0.0833 | -0.1432 | -0.1792 | -0.1925 | -0.1856 | 0.4940 | 0.3575 | 0.2252 | 0.1042 |
| 0.9831 | 0.9333 | 0.8539 | 0.7498 | 0.6274 | 0.7498 | 0.8539 | 0.9333 | 0.9831 |
| 0.1042 | 0.2252 | 0.3575 | 0.4940 | 0.6274 | -0.1925 | -0.1792 | -0.1432 | -0.0833 |
| -0.0417 | -0.0856 | -0.1274 | -0.1624 | -0.1856 | 0.0886 | 0.0810 | 0.0634 | 0.0359 |
| 0.0200 | 0.0409 | 0.0606 | 0.0766 | 0.0866 | -0.0420 | -0.0386 | -0.0303 | -0.0172 |
| -0.0090 | -0.0186 | -0.0279 | -0.0357 | -0.0407 | 0.0170 | 0.0161 | 0.0129 | 0.0075 |
| 0.0031 | 0.0066 | 0.0103 | 0.0137 | 0.0161 | -0.0040 | -0.0042 | -0.0037 | -0.0023 |

Interpolation-filter coefficients for phase-shifts {0.1T, 0.2T, 0.3T, 0.4T, 0.5T, 0.6T, 0.7T, 0.8T, 0.9T}

DIBIT EXTRACTION FOR ESTIMATION OF CHANNEL PARAMETERS

BACKGROUND OF THE INVENTION

1. Field of the Invention

The present invention relates, generally, to channel-parameter estimation, and more particularly, to the estimation of channel parameters in a storage medium, such as a hard-disk drive.

2. Description of the Related Art

Magnetic media-based storage devices, such as hard-disk drives, are commonly used to store data for a wide variety of computing devices, ranging from portable music players to large-scale data centers. Improving the performance and reliability of magnetic storage devices is an ever-present goal.

A typical hard-disk drive includes a plurality of rotating platters having magnetic surfaces and a plurality of read/write heads for reading data from and writing data to the magnetic surfaces. The read/write heads are positioned relative to the magnetic surfaces using servo mechanisms and are controlled by circuitry for generating and detecting electromagnetic fields on the platters. To store data on the drive, write-channel circuitry encodes binary digital data received from a computing device into magnetic encodings, which are written onto the magnetic surfaces. To retrieve data from the drive, the servo mechanisms first locate the appropriate position, and then read-channel circuitry detects and translates the magnetic encodings at that position into the binary digital data originally stored.

The data on the platters is encoded using magnetic-flux reversals between two adjacent locations on the platter in a scheme known as "non-return-to-zero" (NRZ), whereby a bit having a value of 1 is stored on the disk as magnetization in one direction and a bit having a value of 0 is stored as magnetization in the opposite direction.

In one data-detection technique known as peak detection, which was used in early days of longitudinal recording approach, the read channel detects the locations where magnetization changes direction, enabling the recovery of stored sequences of binary ones and zeros. However, this scheme relies on magnetic transitions being relatively isolated from one another, which limits storage density and, consequently, the storage capacity of the drive.

In another data-detection technique known as partial-response maximum-likelihood (PRML) detection, an analog "playback voltage" is digitally sampled to determine the bit pattern most likely represented by the analog waveform sensed by the read head. PRML improves storage density relative to peak detection by writing magnetic transitions closer to one another than in the peak-detection method. Although the reduced isolation of adjacent magnetic transitions tends to cause inter-symbol interference (ISI) due to the overlap of information pulses, PRML detection takes ISI into account by employing equalization techniques to shape the signal from the read head into a target polynomial characterizing the extent to which each bit overlaps with adjacent bits. Accordingly, in storage devices employing PRML detection, read-channel circuitry compensates for such ISI.

If no nonlinearities exist in the recording system, then the playback voltage V(t) in a hard-disk drive can be described by the equation:

$$V(t) = \sum_k \frac{1}{2}(a_{k+1} - a_k)h(t - kT),$$

where $a_k \in \{-1, +1\}$ represents the kth NRZ write-current bit, t represents continuous time, T represents the duration of one bit, and h(t) represents the playback voltage response to an isolated transition.

In a typical hard-disk drive, however, a variety of nonlinearities exist in the recording system, for which the read/write channel should compensate. Improved accuracy in characterizing and compensating for these nonlinearities results in enhanced hard-disk drive performance.

A research paper containing background information concerning such nonlinearities is Palmer et al., "Identification Of Nonlinear Write Effects Using Pseudorandom Sequences," *IEEE Transactions On Magnetics*, Vol. Mag-23, No. 5, September 1987, pp 2377-2379, which is incorporated herein by reference in its entirety and which discusses linear and nonlinear distortions that occur in read channels and describes a technique for separating linear and nonlinear effects, based on the unique properties of a maximal-length pseudorandom bit sequence (PRBS; also referred to as an "m-sequence"). Palmer et al. describe a technique known as "dibit extraction," which analyzes a "dibit response" (i.e. response of read-head to an isolated NRZ bit) to identify and examine nonlinear distortion effects.

Dibit extraction is based on writing and then reading an integer number of periods of a maximal-length PRBS sequence and extracting a dibit response from the playback voltage V(t), whereby the NRZ data bits are deconvolved from the playback data (i.e. a process of determining the system transfer function or impulse response from measured outputs of the system and information on the input) to obtain the dibit response. It is noted that the term "dibit" is used in the art to refer both to the dibit itself and to the dibit response.

If the dibit response is accurate, then proper compensation for nonlinearities in the read channel can be made, e.g., by adjusting the signal as it is being written to disk by using write pre-compensation, or alternatively, by estimating channel pulse-width parameters to improve read operations. The extracted dibit contains information about several types of nonlinear distortions. One type of nonlinear distortion is a nonlinear transition shift (NLTS), which involves two transitions written closely enough that the demagnetizing fields from the previous transitions affect the timing of the writing of the next transition. Another type of nonlinear distortion is a hard transition shift (HTS), which involves reversing the direction of magnetization in already magnetized areas. Other types of nonlinear distortions include, e.g., partial erasure, magneto-resistive head asymmetry (MRA), and over-write (OW). Either the extracted dibit itself or certain metrics computed using the extracted dibit can be used to adapt recording channel parameters to minimize such nonlinearities.

In a typical application, a maximal-length PRBS sequence (e.g., a 127-bit PRBS sequence) is written to disk and then read back to obtain a playback voltage V(t). If $a_k$ is a bit in a maximal-length NRZ PRBS sequence, then nonlinear effects are associated with various products of the bits. For example, MRA is associated with $a_k a_{k-1}$, and NLTS is associated with $a_{k-1} a_k a_{k+1}$. Based on the "shift and add" property of maximal-length PRBS sequences (in which the modulo-2 addition of any two identical PRBS sequences with different phases generates another identical PRBS sequence, but with another phase), the nonlinear NRZ bit products produce echoes in the extracted dibit.

Such nonlinear echoes often cause interference with one another or with the main dibit response, resulting in constructive or destructive interference that can adversely affect the accuracy and usefulness of dibit extraction for characterizing the read/write channel.

Accordingly, it is important to determine the locations of these echoes and compensate for them appropriately.

FIG. 1 shows an exemplary waveform illustrating a dibit response with echoes due to nonlinearities in a longitudinal-recording scenario. FIG. 1 shows the main dibit response 101 along with some possible nonlinear echoes 103, 104, and 106. The vertical axis represents the amplitude of the dibit response signal in volts, and the horizontal axis represents the discrete time shifts of the PRBS sequence. In FIG. 1, 127 values are spread across the horizontal axis in a range of discrete time shifts (measured in bits) from −63 bits to +63 bits. The main dibit response 101 represents the linear response of the read channel. The location of each echo is a result of the "shift and add" property of the PRBS sequence interacting with a particular nonlinearity, and it is therefore possible to predict, generally, the location of each echo. Although, in a longitudinal-recording scenario, the main dibit response 101 has a dipulse shape, as shown in FIG. 1, it is noted that the main dibit response in a perpendicular-recording scenario (not shown) would have the shape of a Gaussian-like pulse.

One known method for estimating channel parameters (e.g., NLTS) involves taking the ratio of associated echo amplitude (or echo area) to the amplitude of the main pulse of the dibit. However, this method results in inaccurate estimation, because there may be overlapping echoes due to more than one type of distortion.

SUMMARY OF THE INVENTION

Embodiments of the present invention develop a more-accurate analysis of an extracted dibit for a given pseudo-random binary sequence (PRBS) polynomial in order to characterize the locations of echoes before those echoes can be used to estimate the parameters of the distortions that caused them. This analysis is used to derive equations for providing a systematic, mathematically sound means to estimate channel parameters, e.g., first and second NLTS, OW, MRA, and channel-bit density (CBD).

In certain embodiments, closed-form equations are developed for estimating NLTS and MRA from echoes. Further, although echoes due to MRA and OW overlap, embodiments of the invention use echoes to accurately estimate MRA and OW, which permits accounting for the overlapping of the associated echoes. Moreover, an interpolation-based approach for estimating CBD from an extracted dibit is provided.

Approaches consistent with embodiments of the present invention offer efficiency in estimating channel parameters, while being mathematically very rigorous, thereby providing a very useful tool in the analysis of heads and media, the assessment of read-write channel quality, the optimization of read-write channel parameters, and other applications.

In one embodiment, the present invention provides a storage-device-implemented method for estimating one or more channel parameters of a storage device including a read channel and a storage medium with a bit sequence stored on the storage medium. The method includes: (a) the storage device reading at least a portion of the bit sequence from the storage medium to generate a bit response; (b) the storage device convolving the bit response to compute an impulse response of the read channel; and (c) the storage device estimating one or more channel parameters based on the computed impulse response.

DETAILED DESCRIPTION

The present invention provides a scheme for estimating several key parameters of a read/write channel using an extracted dibit. These parameters include nonlinear transition shifts (NLTSs) due to transitions one bit earlier (denoted by $\Delta_1$) and due to transitions two bits earlier (denoted by $\Delta_2$), overwrite (OW) (denoted by $\Delta_0$) modeled using hard transition shifts (HTSs), magneto-resistive head asymmetry (MRA) (denoted by $\alpha$), and pulse width of impulse response at 50% amplitude (denoted by PW50). Knowledge of these parameters can help not only to understand the quality of the magnetic medium and the read/write heads, but also to optimize circuitry and/or algorithms used in the read path and the write path of a read/write channel.

Figure 1:
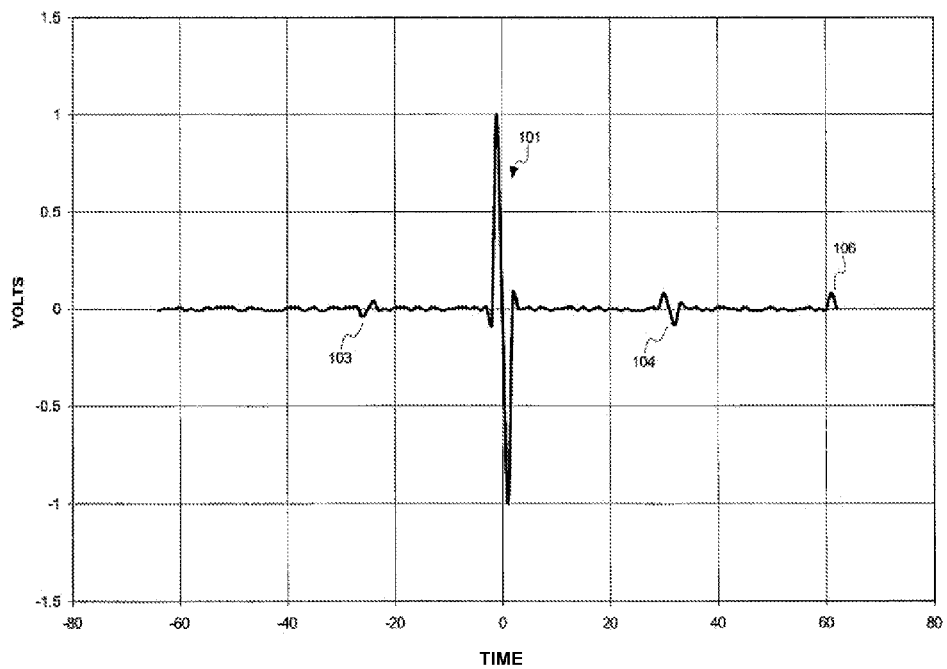
FIG. 1 shows an exemplary waveform illustrating a dibit response with undesirable echoes.
Figure 2:
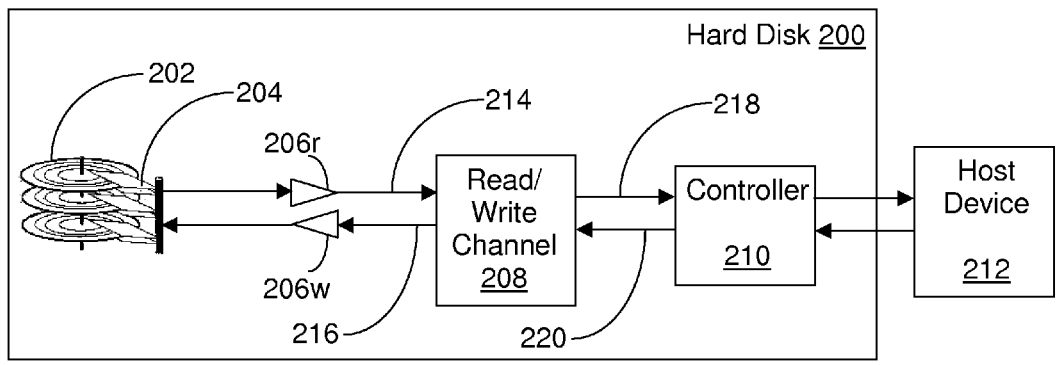
FIG. 2 shows a block diagram of an exemplary hard-disk device consistent with a first embodiment of the invention, coupled to a host device.

FIG. 2 shows a block diagram of an exemplary hard-disk drive 200 consistent with a first embodiment of the invention, coupled to a host device 212. For clarity, certain components of drive 200, e.g., a spindle motor and a servo/actuator motor control, are omitted from FIG. 2. Drive 200 includes one or more magnetic media 202, one or more corresponding read/write heads 204, a read amplifier 206r, a write amplifier 206w, a read/write channel 208, and a controller 210. Read/write channel 208 is coupled to amplifiers 206r, 206w through interfaces 214 and 216 and to controller 210 through interfaces 218 and 220.

During read operations, host device 212 generates an identifier (e.g., a cylinder and sector address) corresponding to a location on magnetic media 202 from which data is to be read and provides the identifier to controller 210. Based on the identifier, controller 210 calculates a physical location on magnetic media 202 from which the data is to be read and moves read/write heads 204 to or near the physical location. Read/write heads 204 provide to read amplifier 206r a stream of analog signals corresponding to data on magnetic media 202 sensed by read/write heads 204. Read amplifier 206r amplifies the analog signals received from read/write heads 204 and provides the amplified signals, through interface 214, to read/write channel 208. Read/write channel 208 decodes the amplified analog signals into digital binary data and provides the digital binary data, through interface 218, to controller 210. Controller 210 acts as an interface between drive 200 and host device 212 and may perform additional functions, e.g., caching, error detection, or error correction.

During write operations, host device 212 provides binary digital data and an identifier (e.g., a cylinder and sector address) corresponding to a location on magnetic media 202 at which the binary digital data is to be written to controller 210. Based on the identifier, controller 210 calculates a physical location on magnetic media 202 at which the data is to be written and moves read/write heads 204 to or near the physical location. Controller 210 provides the digital binary data, through interface 220, to read/write channel 208. Read/write channel 208 encodes the binary digital data, generates corresponding analog signals, and provides the analog signals, through interface 216, to write amplifier 206w. Write amplifier 206w uses the analog signals to drive read/write head 204, which creates on magnetic media 202 magnetic-flux reversals that correspond to the binary digital data.

Figures 3, 4:
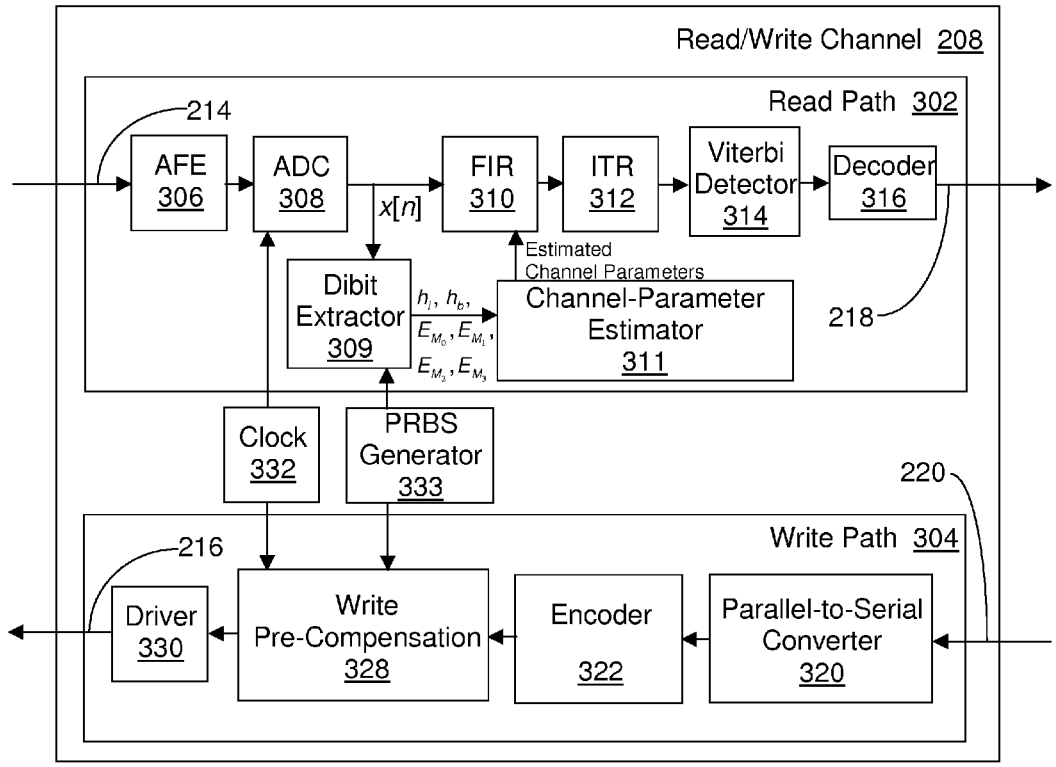
FIG. 3 shows a block diagram of the read/write channel of the hard-disk device of FIG. 2.
FIG. 4 is a table showing interpolation-filter coefficients for generating various phase shifts in embodiments of the invention.

FIG. 3 shows a block diagram of read/write channel 208. For clarity, certain components are omitted from FIG. 3. In this embodiment, read/write channel 208 is implemented as an integrated circuit using a complementary metal oxide semiconductor (CMOS) process for transistors, although it is contemplated that other process technologies may be used, and that the circuitry disclosed herein may be integrated with other circuitry included in drive 200, e.g., controller 210. As described above, read/write channel 208 converts between binary digital information and analog signals corresponding to magnetic flux on magnetic media 202. Read/write channel 208 includes a read path 302, a write path 304, and a clock 332.

Clock 332 provides to read path 302 and write path 304 timing signals for controlling logic operations.

Write path 304 includes a parallel-to-serial converter 320, an encoder 322, a write pre-compensation circuit 328, and a driver circuit 330. Parallel-to-serial converter 320 receives, through interface 220, eight bits of data at a time from controller 210 and generates, from the parallel input data, a serial bit stream, which is provided to encoder 322. Encoder 322 encodes, e.g., using a run-length limited (RLL) algorithm, the serial bit stream into symbolic binary sequences for recording on magnetic media 202 and provides the encoded sequences to write pre-compensation circuit 328. Write pre-compensation circuit 328 dynamically adjusts the pulse widths of the bit stream to account for magnetic distortions in the recording process and provides the adjusted signal to driver circuit 330. Driver circuit 330, through interface 216, drives the adjusted signal to write amplifier 206w, which drives read/write heads 204 to record the data on magnetic media 202.

PRBS generator 333 provides a PRBS sequence to write precompensation circuit 328 in write path 304, so that the PRBS sequence can be written to disk. PRBS generator 333 provides the same PRBS sequence to dibit extractor 309 in read path 302, which reads the PRBS sequence previously written to the disk for the purpose of extracting a dibit response, as will be described in further detail below. In this embodiment, PRBS generator 333 is used only when dibit extraction is desired and not during normal read/write operations.

Read path 302 includes an analog front-end (AFE) 306, an analog-to-digital converter (ADC) 308, a finite impulse-response (FIR) filter 310, an interpolated-timing recovery (ITR) circuit 312, a Viterbi-algorithm detector 314, and a decoder 316. Read/write channel 208 receives, through interface 214, amplified magnetic signals sensed from magnetic media 202 by read/write heads 204. An analog waveform corresponding to the amplified magnetic signals is first provided to AFE 306, which processes the analog waveform to a desired pulse amplitude and bandwidth for conversion to a digital signal.

AFE 306 provides the processed analog signal to ADC 308, which samples the analog signal and converts it to a digital signal by generating a time-sequenced binary signal associated with amplitude samples of the analog signal. ADC 308 provides the sampled digital signal to FIR filter 310 (e.g., a 10-tap FIR filter), which equalizes the samples of the digital signal according to a desired pulse response. FIR filter 310 provides the equalized signal to ITR circuit 312, which adjusts the sample timing of the digital signal to compensate for timing disturbances present in the signal samples. The timing of ITR circuit 312 can be controlled, e.g., by a phase-locked loop (PLL) (not shown).

ITR circuit 312 provides the synchronized digital signal to Viterbi detector 314, which uses digital-signal processing (DSP) techniques to determine the binary bit pattern represented by the digital signal. Viterbi detector 314 provides the binary data represented by the digital signal to decoder 316, which removes the parity bit from the binary bit pattern and performs decoding (e.g., RLL decoding) of the encoded symbols into the actual binary data. Decoder 316 provides the actual binary data, through interface 218, to controller 210.

Read path 302 also includes a dibit extractor 309 and a channel-parameter estimator 311. Dibit extractor 309 receives samples from ADC 308 and a PRBS sequence from PRBS generator 333 and performs a correlation between the samples and a known PRBS sequence previously written to magnetic media 202. This correlation is done with specific delays between the samples and the data bits of the PRBS sequence that correspond to echoes caused by nonlinear distortions and results in the identification of one or more echo points. Dibit extractor 309 further determines a bit response $h_b$ and computes an impulse response $h_i$ using the extracted dibit. Dibit extractor 309 provides at least one of: (i) the extracted echo points (e.g., in the form of amplitudes $E_{M_0}$, $E_{M_1}$, $E_{M_2}$, and $E_{M_3}$ of echoes at positions $M_0$, $M_1$, $M_2$, and $M_3$, respectively), (ii) the bit response $h_b$, and (iii) the computed impulse response $h_i$ to channel-parameter estimator 311, which uses this information to compute channel parameters, e.g., NLTS, HTS, MRA, and channel-bit density (CBD). Channel-parameter estimator 311 may provide one or more of the computed channel parameters to one or more other blocks in read path 302 or write path 304, e.g., to adjust the operation of FIR filter 310.

Signal Model

The operation of dibit extractor 309 and channel-parameter estimator 311 will now be described in further detail.

Dibit extractor 309 receives from ADC 308 a plurality of samples x[n], which are modeled using the following Equations (1a) and (1b):

$$x[n]=z[n]+\alpha z^2[n]+v[n], \quad (1a)$$

with $$z[n] = \sum_k (a[k] - a[k-1])h_s[n-k-\Delta[k]], \quad (1b)$$

where $a[n]\in\{-1, +1\}$ represents an NRZ data bit at instant n, $h_s[k]$ represents a step response of the unequalized channel at the output of ADC 308, $\Delta[k]$ represents an amount of transition shift experienced by a data transition written at a time instant k (where $\Delta[k]>0$ indicates a time delay, $\Delta[k]=0$ indicates no transition shift, and $\alpha[k]<0$ indicates a time advance), $\alpha$ is a parameter representing an amount of asymmetry (i.e., MRA) in the output waveform of read/write heads 204, z[n] represents a playback signal without MRA, and v[n] is a term representing noise. Data bits a[n] are generated by periodically repeating a PRBS sequence of length N bits.

Equations (1a) and (1b) presume that, if drive 200 includes a continuous-time filter (CTF), e.g., for noise removal and/or pulse shaping, then the CTF is either bypassed or set to flat. It is also assumed that AFE 306 performs the functions of an all-pass filter.

Assuming that $\Delta[k]$ is small enough to permit linearization of the signal z[n] with nonlinear transition shifts, z[n] can be expressed using a first-order Taylor series using the following Equations (2a), (2b), and (2c):

$$z[n] \approx z_0[n] + z_1[n], \quad (2a)$$

with $$z_0[n] = \sum_k a[k]h_b[n-k], \text{ and} \quad (2b)$$

$$z_1[n] = -\sum_k \Delta[k](a[k] - a[k-1])h_i[n-k], \quad (2c)$$

where $h_i[k]$ represents an impulse response of the channel, and $h_b[k]$ represents a bit response of the channel. As will be described in further detail below with reference to Equations (21a)-(24), the values of $h_b[k]$ are obtained after post-processing the extracted dibit using an algorithm for baseline correction. Substituting Equation (2a) into Equation (1a) results in the following Equations (3a) and (3b):

$$x[n] = z_0[n] + z_1[n] + \alpha z_0^2[n] + z_2\%1 + v[n], \quad (3a)$$

where $z_2[n] = \alpha z_1^2[n] + 2\alpha z_0[n]z_1[n]$, \quad (3b)

with $z_2[n]$ representing a residual term that is expected to be much smaller in strength compared to $z_1[n]$ and $\alpha z_2[n]$, because $z_2[n]$ is a product of two relatively small terms.

Dibit Echoes Caused by NLTS, OW, and MRA

Given Equations (3a) and (3b), the locations of echoes due to NLTS, OW, and MRA can now be determined. In view of the three types of transition shifts, $\Delta[k]$ can be expressed using the following Equation (4):

$$\Delta[k] = \frac{\Delta_0}{4}(1 - a[k]a[k-1])(1 + a[k]) + \quad (4)$$

$$\frac{\Delta_1}{4}(1 - a[k]a[k-1])(1 - a[k-1]a[k-2]) +$$

$$\frac{\Delta_2}{4}(1 - a[k]a[k-1])(1 - a[k-2]a[k-3]).$$

Due to the shift-and-add property of PRBS sequences, $\Delta[k](a[k]-a[k-1])$ can be expressed using the following Equations (5a) and (5b):

$$(a[k] - a[k-1])\Delta[k] = \frac{\Delta_0}{2}a[k - M_0] - \frac{\Delta_1}{2}a[k - M_1] - \quad (5a)$$

$$\frac{\Delta_2}{2}a[k - M_2] + \frac{\Delta_2}{2}a[k - M_1 - 1] + \Delta_3[k],$$

with $$\Delta_3[k] = \frac{\Delta_0}{2}(1 + a[k] - a[k-1]) + \quad (5b)$$

$$\frac{\Delta_1}{2}(a[k] - a[k-1] + a[k-2]) + \frac{\Delta_2}{2}(a[k] - a[k-1]),$$

where $\Delta_3[k]$ sums up all of the constant and linear terms. In Equations (5a) and (5b), integers $\{M_0, M_1, M_2\}$ follow from the shift-and-add property of PRBS sequences and are given by the following Equations (6a)-(6d):

$$a[k]a[k-1] = -a[k-M_0], \quad (6a)$$

$$a[k]a[k-1]a[k-2] = a[k-M_1], \quad (6b)$$

$$a[k]a[k-2]a[k-3] = a[k-M_2], \text{ and} \quad (6c)$$

$$a[k]a[k-2] = -a[k-M_3]. \quad (6d)$$

In view of Equation (5), the signal corresponding to transition shifts (ignoring $\Delta_3[k]$) can be expressed as the following Equations (7a), (7b), and (7c):

$$z_1[n] = -\frac{\Delta_0}{2}q[n - M_0] + \quad (7a)$$

$$\frac{\Delta_1}{2}q[n - M_1] + \frac{\Delta_2}{2}q[n - M_2] - \frac{\Delta_2}{2}q[n - M_1 - 1],$$

where $$q[n] = \sum_k a[k]h_i[n-k], \quad (7b)$$

$$\Rightarrow z_1[n] = \sum_k a[k]\left(-\frac{\Delta_0}{2}h_i[n - k - M_0] + \frac{\Delta_1}{2}h_i[n - k - M_1] + \right. \quad (7c)$$

$$\left. \frac{\Delta_2}{2}h_i[n - k - M_2] - \frac{\Delta_2}{2}h_i[n - k - M_1 - 1]\right),$$

where the symbol "$\Rightarrow$" means "which implies that."

Given Equation (2b), $z_0^2[n]$ can be expressed using the following Equations (8a) and (8b):

$$z_0^2[n] = 2\sum_k a[k]a[k-1]h_b[n-k]h_b[n-k+1] + \quad (8a)$$

$$2\sum_k a[k]a[k-2]h_b[n-k]h_b[n-k+2] + z_3[n],$$

where $$z_3[n] = \sum_k \sum_{l \neq \{k-1, k-2\}} a[k]a[l]h_b[n-k]h_b[n-l]. \quad (8b)$$

The term $z_3[n]$ in Equation (8b) is a residual term containing all products other than $a[k]a[k-1]$ and $a[k]a[k-2]$. Due to the shift-and-add property of PRBS sequences, the signal corresponding to MRA (ignoring $z_3[n]$) can be expressed as the following Equation (9):

$$\alpha z_0^2[n] = -2\alpha \sum_k a[k]h_b[n - k - M_0]h_b[n - k - M_0 + 1] - \quad (9)$$

$$2\alpha \sum_k a[k]h_b[n - k - M_3]h_b[n - k - M_3 + 2].$$

Combining the terms $z_1[n]$ and $\alpha z_0^2[n]$ provides the combined signal corresponding to transition shifts and MRA as given in the following Equation (10):

$$z_1[n] + \alpha z_0^2[n] = -\sum_k a[k] \quad (10)$$

$$\left(\frac{\Delta_0}{2}h_i[n - k - M_0] + 2\alpha h_b[n - k - M_0]h_b[n - k - M_0 + 1]\right) +$$

$$\sum_k a[k]\left(\frac{\Delta_1}{2}h_i[n - k - M_1] - \frac{\Delta_2}{2}h_i[n - k - M_1 - 1]\right) +$$

$$\frac{\Delta_2}{2}\sum_k a[k]h_i[n - k - M_2] -$$

$$2\alpha \sum_k a[k]h_b[n - k - M_3]h_b[n - k - M_3 + 2].$$

The different terms in Equation (10) represent the echoes due to transition shifts and MRA, which echoes were derived from the extracted dibit. The following three observations should be made with regard to Equation (10):

First, echoes due to overwrite and MRA overlap at position $M_0$. Consequently, it is not possible to estimate either MRA or OW individually by direct observation of the echo.

Second, the presence or absence of MRA and/or OW does not affect the echoes due to NLTS, so long as the PRBS sequence is chosen such that the shifts $\{M_0, M_1, M_2, M_3\}$ are sufficiently far apart from each other. Consequently, in principle, it should be possible to estimate NLTS, regardless of whether MRA and/or OW are present.

Third, echoes due to first and second NLTS overlap at position $M_1$. Consequently, it is not possible to estimate these NLTSs by direct observation of the echo at $M_1$.

The amplitudes $E_{M_0}$, $E_{M_1}$, $E_{M_2}$, and $E_{M_3}$ of echoes at positions $M_0$, $M_1$, $M_2$, and $M_3$, respectively, can be obtained by correlating the output of ADC 308 with the terms $a[n-M_0-m]$, $a[n-M_1-m]$, $a[n-M_2-m]$, and $a[n-M_3-m]$, respectively, which is done as part of the dibit extraction process. This results in the following Equations (11a), (11b), (11c), and (11d):

$$E_{M_0}[m] = h_b[k_0 + M_0 + m] = -\frac{\Delta_0}{2} h_i[m] - 2\alpha h_b[m]h_b[m+1], \quad (11a)$$

$$E_{M_1}[m] = h_b[k_0 + M_1 + m] = \frac{\Delta_1}{2} h_i[m] - \frac{\Delta_2}{2} h_i[m-1], \quad (11b)$$

$$E_{M_2}[m] = h_b[k_0 + M_2 + m] = \frac{\Delta_2}{2} h_i[m], \text{ and} \quad (11c)$$

$$E_{M_3}[m] = h_b[k_0 + M_3 + m] = -2\alpha h_b[m]h_b[m+2], \quad (11d)$$

where $k_0$ denotes the location of the peak sample in $h_b[k]$. Equations (11a)-(11c), except for the MRA term, resemble the expressions given in the research paper by Lin and Wood, "An estimation technique for accurately modeling the magnetic recording channel including nonlinearities," *IEEE Transactions on Magnetics*, Vol. 25, No. 5, pp. 4084-4086, September 1989, which is incorporated herein by reference in its entirety, and which discusses modeling and characterization of nonlinear distortions due to transition shifts in magnetic recording channels.

It is noted that, in this embodiment, a PRBS sequence of length N=127 is used, and dibit $h_b[k]$ will have a corresponding length of 127 coefficients. Therefore, the argument $k_0+M+m$ in the expression $h_b[k_0+M+m]$ should be evaluated using modulo-N for all $M \in \{M_0, M_1, M_2, M_3\}$.

Since $h_b[m]$ and $h_i[m]$ will be close to zero for large values of m, the possible values of m are restricted to $m \in \{-2, -1, 0, 1, 2\}$, where m=0 is such that $h_b[0]$ and $h_i[0]$ correspond to the peak samples in $h_b[k]$ and $h_i[k]$, respectively (i.e., $k_0$=0).

Estimation of NLTS, OW, and MRA

Once amplitudes $E_{M_0}$, $E_{M_1}$, $E_{M_2}$, and $E_{M_3}$ of the four echoes at positions $M_0$, $M_1$, $M_2$, and $M_3$, respectively, have been determined using Equations (11a), (11b), (11c), and (11d), this information can be used to estimate one or more characteristics (e.g., NLTS, OW, and MRA) of read/write channel 208.

Accordingly, dibit extractor 309 provides the values of $E_{M_0}$, $E_{M_1}$, $E_{M_2}$, and $E_{M_3}$, together with impulse-response values $h_i$ to channel-parameter estimator 311, which provides estimates for the parameters $\{\Delta_0, \Delta_1, \Delta_2, \alpha\}$, respectively. These parameters can be estimated, e.g., using the following Equations (12a), (12b), (12c), and (12d):

$$\hat{\Delta}_2 = \frac{2}{h_i[0]} E_{M_2}[0], \quad (12a)$$

$$\hat{\alpha} = -\frac{E_{M_3}[0]}{2h_b[0]h_b[2]}, \quad (12b)$$

$$\hat{\Delta}_1 = \frac{1}{h_i[0]}(2E_{M_1}[0] + \hat{\Delta}_2 h_i[-1]), \quad (12c)$$

$$\hat{\Delta}_0 = -\frac{1}{h_i[0]}(2E_{M_0}[0] + 4\hat{\alpha} h_b[0]h_b[1]). \quad (12d)$$

To improve estimation accuracy in the presence of noise and other disturbances, it is desirable to make use of more values of m. In other words, an average is taken across different values of m to improve the signal-to-noise ratio of the parameters of interest. This can be done using the following Equations (13a), (13b), (13c), and (13d), which are implemented in channel-parameter estimator 311:

$$\hat{\Delta}_2 = 2\frac{E_{M_2}[-1] + E_{M_2}[0] + E_{M_2}[1]}{h_i[-1] + h_i[0] + h_i[1]}, \quad (13a)$$

$$\hat{\alpha} = \left(-\frac{1}{2}\right)\left(\frac{E_{M_3}[-2] + E_{M_3}[-1] + E_{M_3}[0]}{h_b[-2]h_b[0] + h_b[-1]h_b[1] + h_b[0]h_b[2]}\right), \quad (13b)$$

$$\hat{\Delta}_1 = \frac{2(E_{M_1}[-1] + E_{M_1}[0] + E_{M_1}[1]) + \hat{\Delta}_2(h_i[-2] + h_i[-1] + h_i[0])}{h_i[-1] + h_i[0] + h_i[1]}, \quad (13c)$$

$$\hat{\Delta}_0 = -2\sum_{k=-1}^{1} \frac{E_{M_0}[k] + 2\hat{\alpha} h_b[k]h_b[k+1]}{h_i[-1] + h_i[0] + h_i[1]}. \quad (13d)$$

Evaluation of impulse response $h_i[m]$ from bit response $h_b[m]$ will be described in further detail below, under the heading "Obtaining Impulse Response and Estimation of PW50."

Selection of PRBS Sequence

The values of echo locations $M_0$, $M_1$, $M_2$, and $M_3$ for specific PRBS polynomials and the choice of PRBS polynomials will now be discussed.

For a given length of PRBS sequence, there are several choices for polynomials used to generate the PRBS sequence. Examples of such polynomials are provided in Y. Lin, "'Shift and add' property of m-sequences and its application to channel characterisation of digital magnetic recording," *IEEE Proc. Commun.*, Vol. 142, No. 3, pp. 135-140, June 1995, which is incorporated herein by reference in its entirety. While sequences resulting from all these polynomials will satisfy the special correlation property of PRBS sequences, as will be discussed in further detail below with reference to Equations (21a)-(24), the accuracy of the parameters estimated might change from one polynomial to another, since the locations of echoes corresponding to different nonlinearities depend on the polynomial selected. If the echoes are not well-separated, then the resulting overlap can affect the accuracy of the estimation process, unless Equations (11a)-(13d) are modified to reflect the overlap.

To simplify the estimation of parameters, a polynomial should be chosen for which the echoes are maximally separated from one other. To illustrate this, two different polynomials for generating a 127-bit PRBS sequence, as set forth in the following Equations (14a) and (14b), are considered:

$$p_1(z) = 1 + z^4 + z^7, \quad (14a)$$

$$p^2(z) = 1 + z^4 + z^5 + z^6 + z^7 \quad (14b)$$

The echo locations for these two polynomials are given by the following Equations (15a) and (15b):

$$\{M_0, M_1, M_2, M_3\} = \{-30, 26, -12, -60\} \text{ for } p_1(z), \quad (15a)$$

$$= \{-86, -95, -20, -45\} \text{ for } p_2(z). \quad (15b)$$

It should be observed that echo locations $\{M_0, M_1\}$ are close in the case of $p_2(z)$ as compared to $p_1(z)$. Therefore, better accuracy with $p_1(z)$, as compared to $p_2(z)$, should be expected, and therefore, it is preferable to use $p_1(z)$ as given in Equation (14a) as a polynomial for generating a 127-bit PRBS sequence. Since the PRBS sequence has bit length 127, it is noted that $M_3 = -60$ is equivalent to $M_3 = -60 + 127 = 67$.

Obtaining Impulse Response and Estimation of PW50

Dibit extraction can also be used to estimate channel-bit density (CBD). For example, the parameter PW50, which is used to indicate normalized linear bit density, is the width of impulse response $h_i$ at half the peak amplitude.

Impulse response $h_i$ can be obtained from an extracted dibit by determining the step response and then differentiating that step response. Thus, a filter appropriate for generating an impulse response from a bit response can be obtained by passing a step input through a differentiating filter. A differentiating filter can be constructed by taking the difference between two 11-tap interpolation filters designed for phase shifts 0.01 T and −0.01 T, respectively, and dividing the difference by 0.02 T, where T represents the duration of one channel bit. The interpolation filters are preferably designed using a raised-cosine function with an excess bandwidth of 25%. This results in a filter having the following coefficients, which allow impulse response to be determined from bit response:

$$\{0.0269, -0.0564, 0.1321, -0.2605, 0.6823, 0.6823, -0.2605, 0.1321, -0.0564, 0.0269\}. \quad (16)$$

If $h_b[k]$ denotes the bit response (which is obtained by post-processing the extracted dibit, as described below with reference to Equations (21a)-(24)), then the T-spaced impulse response $h_i[k]$ is obtained by convolving $h_b[k]$ with the filter coefficients given in Formula (16) (although it should be recognized that other filters or filter coefficients could be used in alternative embodiments). The resulting impulse response, $h_i[k]$, can be used in Equations (13a), (13b), (13c), and (13d) for estimating the channel parameters, with $h_i[0]$ corresponding to the peak sample in the impulse response.

To estimate PW50, the half-amplitude points are first located. To do so, an oversampled impulse response is employed, whereby interpolation filters are used to generate finely-spaced samples. Coefficients for interpolation filters for generating phase-shifts of {0.1 T, 0.2 T, 0.3 T, 0.4 T, 0.5 T, 0.6 T, 0.7 T, 0.8 T, 0.9 T} from a T-spaced impulse response (using a raised-cosine function with 25% excess bandwidth) are provided in the table shown in FIG. 4, which may be implemented, e.g., using a look-up table. It is noted that the interpolation filters for 0.6 T, 0.7 T, 0.8 T, and 0.9 T are time-reversed versions of the filters for phases 0.4 T, 0.3 T, 0.2 T, and 0.1 T, respectively.

Since the only area of interest is the region around the peak, it is sufficient to generate finely-spaced samples during the interval [−2 T, 2 T] around the peak of impulse response $h_i$. If $h_i[0]$ denotes the peak sample of the T-spaced impulse response, then the impulse response at time $mT+0.1 lT$ can be computed for $m = -2, -1, 0, 1, 2$ using the following Equations (17a), (17b), (17c), and (17d):

$$h_i(mT+0.1lT) = H_l^T * h[m], \text{ for } l=1,2,3,4,5 \quad (17a)$$

$$= H_l^T * h[m+1], \text{ for } l=6,7,8,9 \quad (17b)$$

where $h[m] = [h_i[m-5], h_i[m-4], \ldots, h_i[m+5]]^T$, and (17c)

$$h_i(mT) = h_i[m], \text{ for } m = -2, -1, 0, 1, 2. \quad (17d)$$

where the expression $H_l^T$ denotes the filter coefficients in the lth column in the table of FIG. 4, and the expression $h[m]$ denotes an 11×1 vector of T-spaced impulse response samples centered around $h_i[m]$. Once $h_i(mT+0.1 lT)$ has been calculated for $m = -2, -1, 0, 1, 2$ and $l = 0, 1, \ldots, 9$, the parameter PW50 can be estimated using the following five steps:

First, a vector g is constructed using the following Equation (18):

$$g = [h_i(-2T), h_i(-1.9T), h_i(-1.8T), \ldots, h_i(1.9T), h_i(2T)]^T. \quad (18)$$

Second, vector g is normalized by its peak value, with the resulting vector being $\tilde{g}$.

Third, a pair of integers $P_1$ and $P_2$ is determined such that $\tilde{g}[P_1]$ and $\tilde{g}[P_2]$ are the closest to 0.5 (or another selected value) on either side of the peak sample in normalized vector $\tilde{g}$.

Fourth, using linear interpolation, the locations of half-peak amplitudes $\{\beta_1, \beta_2\}$ on either side of the peak sample in normalized vector $\tilde{g}$ are computed using the following Equations (19a)-(19f):

$$\beta_1 = P_1 - 1 + \frac{0.5 - \tilde{g}[P_1 - 1]}{\tilde{g}[P_1] - \tilde{g}[P_1 - 1]} \quad \text{if } \tilde{g}[P_1] > 0.5, \quad (19a)$$

$$= P_1 + \frac{0.5 - \tilde{g}[P_1]}{\tilde{g}[P_1 + 1] - \tilde{g}[P_1]} \quad \text{if } \tilde{g}[P_1] < 0.5, \text{ and} \quad (19b)$$

$$= P_1 \quad \text{otherwise.} \quad (19c)$$

$$\beta_2 = P_2 + \frac{0.5 - \tilde{g}[P_2]}{\tilde{g}[P_2 + 1] - \tilde{g}[P_2]} \quad \text{if } \tilde{g}[P_2] > 0.5, \quad (19d)$$

$$= P_2 - 1 + \frac{0.5 - \tilde{g}[P_2 - 1]}{\tilde{g}[P_2] - \tilde{g}[P_2 - 1]} \quad \text{if } \tilde{g}[P_2] < 0.5, \text{ and} \quad (19e)$$

$$= P_2 \quad \text{otherwise.} \quad (19f)$$

Fifth, PW50 is estimated using the following Equation (20):

$$P\hat{W}50 = (\beta_2 - \beta_1) * 0.1T. \quad (20)$$

Post-Processing for Extracted Dibit

In Equations (11a), (11b), (11c), and (11d), it is assumed that the correlation of the PRBS sequence is 1 for a lag (sample delay) of zero and 0 for non-zero lags (where a non-zero lag of k means cross-correlation at a relative shift of k bits or samples, i.e., a[n] with a[n−k]). This same assumption is implicitly made in much of the prior art related to dibit extraction. However, in reality, the correlation of the PRBS sequence is 1 for a lag of zero and −1/N for non-zero lags, which results in a non-zero baseline in an extracted dibit, where N denotes the length of one period of the PRBS sequence. Correction to the baseline should therefore be made before the dibit is used for estimating channel parameters. This is important in perpendicular recording, because bit response and impulse response have non-zero DC values in perpendicular recording, as compared to zero DC values in longitudinal recording. Correction for this non-zero correlation is performed through the following post-processing method, additional details of which are provided in U.S. patent application Ser. No. 12/463,626 entitled "Systems and Methods for Dibit Correction," which is incorporated herein by reference in its entirety.

The linear readback signal is given by Equation (2b) as $$z_0[n] = \sum_k a[k]h_b[n-k],$$

where $h_b[k]$ is the true bit response. Using the correlation property of PRBS sequences, the extracted dibit can be expressed using the following Equations (21a) and (21b):

$$p[m] = h_b[m] - \frac{1}{N}\sum_{k \neq m} h_b[k] = \frac{N+1}{N} h_b[m] - \frac{1}{N}\sum_k h_b[k], \quad (21a)$$

$$\Rightarrow \sum_m p[m] = \frac{1}{N}\sum_m h_b[m]. \quad (21b)$$

If it is assumed that the non-negligible values in the true bit response (i.e., the values that would be expected to be found after post-processing the extracted dibit) are $h_b[k]$ for $k=M_1$, $M_1+1, \ldots, M_2$, where $M_1$ and $M_2$ are integers, then the extracted dibit can be expressed using the following Equations (22a) and (22b):

$$p[m] = \frac{N+1}{N} h_b[m] - \frac{1}{N}\sum_{k=M_1}^{M_2} h_b[k], \quad (22a)$$
$$\text{for } m \in \{M_1, M_1+1, \ldots, M_2\}$$

$$= -\frac{1}{N}\sum_{k=M_1}^{M_2} h_b[k], \quad \text{for } m \notin \{M_1, M_1+1, \ldots, M_2\} \quad (22b)$$

Using Equation (22a), the following Equations (23a) and (23b) can be derived:

$$\sum_{m=M_1}^{M_2} p[m] = \frac{N - M_2 + M_1}{N} \sum_{k=M_1}^{M_2} h_b[k], \quad (23a)$$

$$\Rightarrow \frac{1}{N}\sum_k h_b[k] = \frac{1}{N}\sum_{k=M_1}^{M_2} h_b[k] = \frac{1}{N - M_2 + M_1}\sum_{m=M_1}^{M_2} p[m]. \quad (23b)$$

Substituting Equation (22a) into Equation (21a) results in the following Equation (24), which provides the post-processed dibit:

$$h_b[m] = \left(p[m] + \frac{1}{N - M_2 + M_1}\sum_{m=M_1}^{M_2} p[m]\right)\frac{N}{N+1}. \quad (24)$$

It is noted that the terms used for computing the second term inside the brackets on the right-hand side of Equation (24) are from the main pulse of the extracted dibit and do not include the nonlinear portions of the extracted dibit. These terms will be non-zero even for AC-coupled channels. Further, it should be understood that it is not necessary to extract the complete dibit for the purpose of computing the post-processing term, which is beneficial in scenarios in which only parts of the dibit are extracted, such as in the case of NLTS estimation. In such cases, it is sufficient to extract only the main pulse of the dibit and the portion used for the estimation, and the extracted portions can be used to compute the post-processing term.

Summary of Exemplary Channel-Parameter Estimation Method

Figure 5:
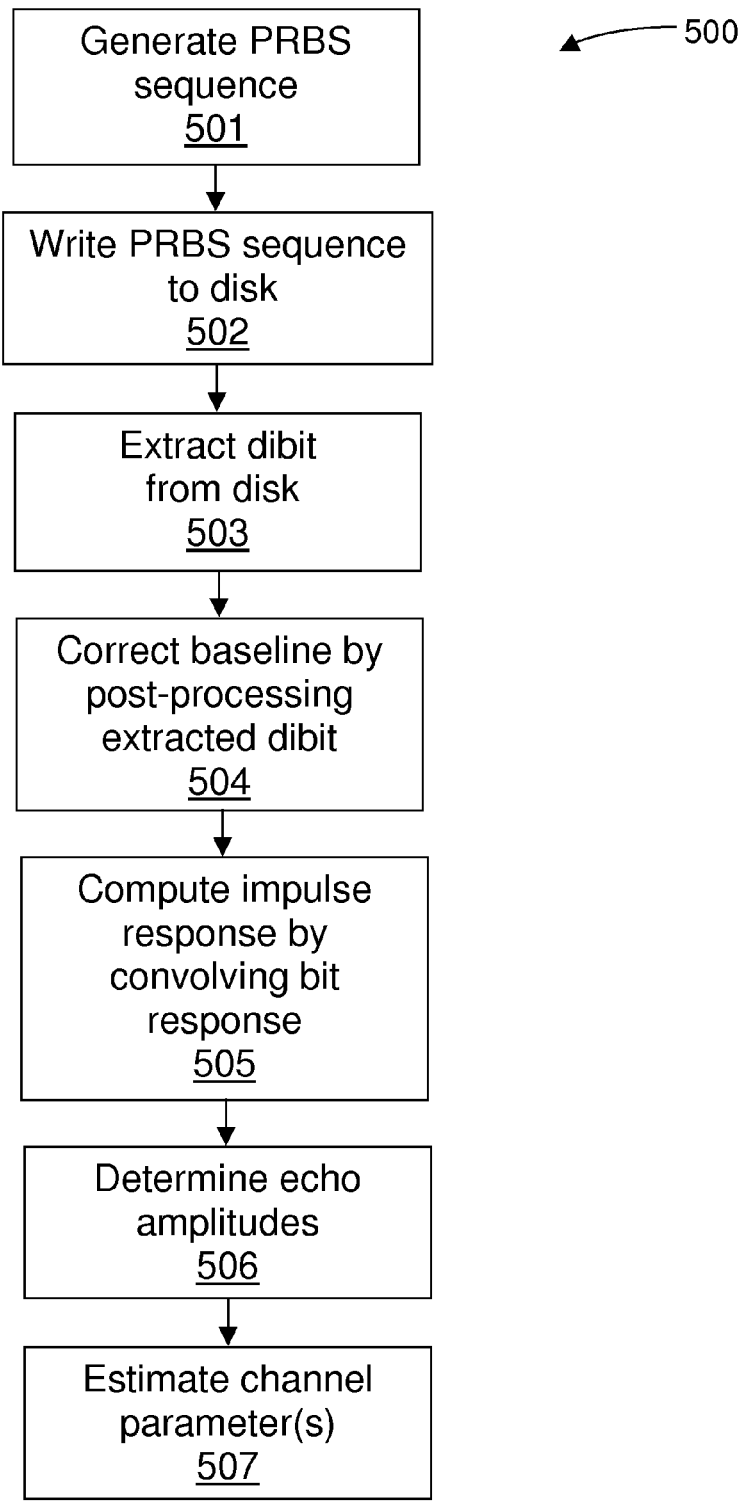
FIG. 5 is a flow diagram illustrating an exemplary method for estimating channel parameters consistent with embodiments of the present invention.

FIG. 5 is a flow diagram illustrating one exemplary method 500 for estimating channel parameters consistent with embodiments of the present invention. As shown, first, at step 501, a 127-bit PRBS sequence is generated, e.g., using the polynomial $p(z)=1+z^4+z^7$, as set forth in Equation (14a), which is preferably used because it results in large separation between the echoes caused by the various nonlinear distortions. Next, at step 502, a periodic repetition of the PRBS sequence is written to the disk. At step 503, the dibit is subsequently extracted from the disk using the PRBS sequence. At step 504, the extracted dibit is post-processed to perform baseline correction. At step 505, the impulse response $h_i[k]$ of the channel is computed by convolving the bit response $h_b[k]$, e.g., with the filter coefficients given in Formula (16). At step 506, amplitudes $E_{M_0}$, $E_{M_1}$, $E_{M_2}$ and $E_{M_3}$ of the four echoes at positions $M_0$, $M_1$, $M_2$, and $M_3$, respectively, are determined. It is noted that step 506 is not necessary for computation of CBD (e.g., PW50), which does not use the echo amplitudes. At step 507, estimations of channel parameters are made. For example, first NLTS, second NLTS, MRA, and OW are estimated using Equations (13a), (13b), (13c), and (13d), or PW50 is estimated using Equation (20).

Alternative Embodiments

Although dibit extraction is discussed herein as occurring at the input to an equalizer (e.g., FIR filter 310), i.e., at the output of the ADC, it should be understood that samples could alternatively be collected from the output of the equalizer. In that scenario, NLTS, HTS, and MRA can still be estimated, although accuracy of MRA might be reduced relative to sample collection at the ADC output.

An interpolation-based approach for estimating CBD from an extracted dibit in the case of perpendicular recording is provided herein, under the heading "Obtaining Impulse Response and Estimation of PW50." Embodiments of the invention use this interpolation approach to construct an impulse response from an extracted dibit, and CBD is estimated by calculating the half-amplitude width of the impulse response. In alternative embodiments, however, and particularly in the case of longitudinal recording, a similar interpolation approach can be used to obtain the step response, and CBD can be estimated from the half-amplitude width of the step response.

Although embodiments of the present invention are described as implemented in a hard-disk drive, it should be recognized that, in alternative embodiments, the invention may be implemented in other storage media, including tape drives, optical disk drives, and magneto-optical disk drives, as well as communication channels used for networks, telephony, and wired/wireless data communications.

It will be further understood that various changes in the details, materials, and arrangements of the parts which have been described and illustrated in order to explain the nature of this invention may be made by those skilled in the art without departing from the scope of the invention as expressed in the following claims.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

We claim:

1. A storage-device-implemented method for estimating one or more channel parameters of a storage device comprising a read channel and a storage medium having a bit sequence stored thereon, the method comprising:
   (a) the storage device reading at least a portion of the bit sequence from the storage medium to generate a bit response;
   (b) the storage device convolving the bit response to compute an impulse response of the read channel; and
   (c) the storage device estimating one or more channel parameters based on the computed impulse response.

2. The method of claim 1, wherein step (c) comprises:
   (c1) the storage device estimating at least one channel parameter based on both the bit response and the computed impulse response.

3. The method of claim 2, wherein step (c) comprises:
   (c1) the storage device estimating at least one channel parameter based on the bit response but not the impulse response;
   (c2) the storage device estimating at least one channel parameter based on the impulse response but not the bit response; and
   (c3) the storage device estimating at least one channel parameter based on both the impulse response and the bit response.

4. The method of claim 2, wherein the one or more channel parameters comprise a nonlinear transition shift (NLTS) that causes at least one of the echoes.

5. The method of claim 4, wherein step (c) comprises the storage device generating an estimated NLTS shift $\hat{\Delta}_1$ due to a transition one bit earlier using:

$$\hat{\Delta}_1 = \frac{2(E_{M_1}[-1] + E_{M_1}[0] + E_{M_1}[1]) + \hat{\Delta}_2(h_i[-2] + h_i[-1] + h_i[0])}{h_i[-1] + h_i[0] + h_i[1]},$$

where:
   $h_i[k]$ represents impulse response at a time instant k,
   $E_{M_1}$ represents amplitude of an echo, and
   $\hat{\Delta}_2$ represents estimated NLTS shift due to a transition two bits earlier.

6. The method of claim 4, wherein step (c) comprises the storage device generating an estimated NLTS shift $\hat{\Delta}_2$ due to a transition two bits earlier using:

$$\hat{\Delta}_2 = 2\frac{E_{M_2}[-1] + E_{M_2}[0] + E_{M_2}[1]}{h_i[-1] + h_i[0] + h_i[1]},$$

where:
   $h_i[k]$ represents impulse response at a time instant k, and
   $E_{M_2}$ represents amplitude of an echo.

7. The method of claim 2, wherein the one or more channel parameters comprise overwrite (OW) that causes at least one of the echoes.

8. The method of claim 7, wherein step (c) comprises the storage device generating an estimated OW $\hat{\Delta}_0$ using:

$$\hat{\Delta}_0 = -2\sum_{k=-1}^{1} \frac{E_{M_0}[k] + 2\hat{\alpha}h_b[k]h_b[k+1]}{h_i[-1] + h_i[0] + h_i[1]}.$$

where:
   $h_i[k]$ represents impulse response at a time instant k,
   $h_b[k]$ represents bit response at a time instant k,
   $E_{M_0}$ represents amplitude of an echo, and
   $\hat{\alpha}$ represents estimated magneto-resistive head asymmetry (MRA).

9. The method of claim 2, wherein the one or more channel parameters comprise magneto-resistive head asymmetry (MRA) that causes at least one of the echoes.

10. The method of claim 9, wherein step (c) comprises the storage device generating an estimated MRA $\hat{\alpha}$ using:

$$\hat{\alpha} = \left(-\frac{1}{2}\right)\left(\frac{E_{M_3}[-2] + E_{M_3}[-1] + E_{M_3}[0]}{h_b[-2]h_b[0] + h_b[-1]h_b[1] + h_b[0]h_b[2]}\right),$$

where:
   $h_b[k]$ represents bit response at a time instant k, and
   $E_{M_3}$ represents amplitude of an echo.

11. The method of claim 1, wherein step (c) comprises:
(c1) the storage device generating, based on the computed impulse response, an estimated channel-bit density of information on the storage medium.

12. The method of claim 11, wherein step (c1) comprises:
(c1i) the storage device constructing a vector g based on the computed impulse response;
(c1ii) the storage device normalizing the vector g by its peak value to provide a normalized vector $\tilde{g}$;
(c1iii) the storage device determining a pair of integers $P_1$ and $P_2$ such that the values $\tilde{g}[P_1]$ and $\tilde{g}[P_2]$ are the closest to a selected value on either side of a peak sample in normalized vector $\tilde{g}$;
(c1iv) the storage device computing locations of half-peak amplitudes on either side of the peak sample in normalized vector $\tilde{g}$; and
(c1v) the storage device estimating channel-bit density based on the locations of the half-peak amplitudes.

13. The method of claim 1, further comprising:
(d) the storage device using one or more of the channel parameters to compensate for one or more nonlinearities in the read channel.

14. A storage device comprising:
a read channel; and
a storage medium, wherein the read channel is adapted to:
(a) read at least a portion of a bit sequence from the storage medium to generate a bit response;
(b) convolve the bit response to compute an impulse response of the read channel; and
(c) estimate one or more channel parameters based on the computed impulse response.

15. The storage device of claim 14, wherein the estimating of the one or more channel parameters comprises:
(c1) estimating at least one channel parameter based on both the bit response and the computed impulse response.

16. The storage device of claim 15, wherein the one or more channel parameters comprise a nonlinear transition shift (NLTS) that causes at least one of the echoes.

17. The storage device of claim 15, wherein the one or more channel parameters comprise overwrite (OW) that causes at least one of the echoes.

18. The storage device of claim 15, wherein the one or more channel parameters comprise magneto-resistive head asymmetry (MRA) that causes at least one of the echoes.

19. The storage device of claim 14, wherein step (c) further comprises generating, based on the computed impulse response, an estimated channel-bit density of information on the storage medium.

20. A non-transitory machine-readable storage medium, having encoded thereon program code, wherein, when the program code is executed by a machine, the machine implements a method for estimating one or more channel parameters of a storage device comprising a read channel and a storage medium having a bit sequence stored thereon, the method comprising:
(a) reading at least a portion of the bit sequence from the storage medium to generate a bit response;
(b) convolving the bit response to compute an impulse response of the read channel; and
(c) estimating one or more channel parameters based on the computed impulse response.

* * * * *